March 17, 1925.  1,530,378

J. T. LANFRANCHI

MACHINE FOR SHARPENING WITH A GRINDSTONE CIRCULAR AND BAND SAWS

Filed Jan. 10, 1921   4 Sheets-Sheet 1

INVENTOR
JEAN T. LANFRANCHI
BY
ATTORNEYS

March 17, 1925.  1,530,378
J. T. LANFRANCHI
MACHINE FOR SHARPENING WITH A GRINDSTONE CIRCULAR AND BAND SAWS
Filed Jan. 10, 1921    4 Sheets-Sheet 2

INVENTOR
JEAN T. LANFRANCHI
BY
ATTORNEYS

March 17, 1925.  1,530,378
J. T. LANFRANCHI
MACHINE FOR SHARPENING WITH A GRINDSTONE CIRCULAR AND BAND SAWS
Filed Jan. 10, 1921 4 Sheets-Sheet 3
Fig. 4.
Fig. 5.
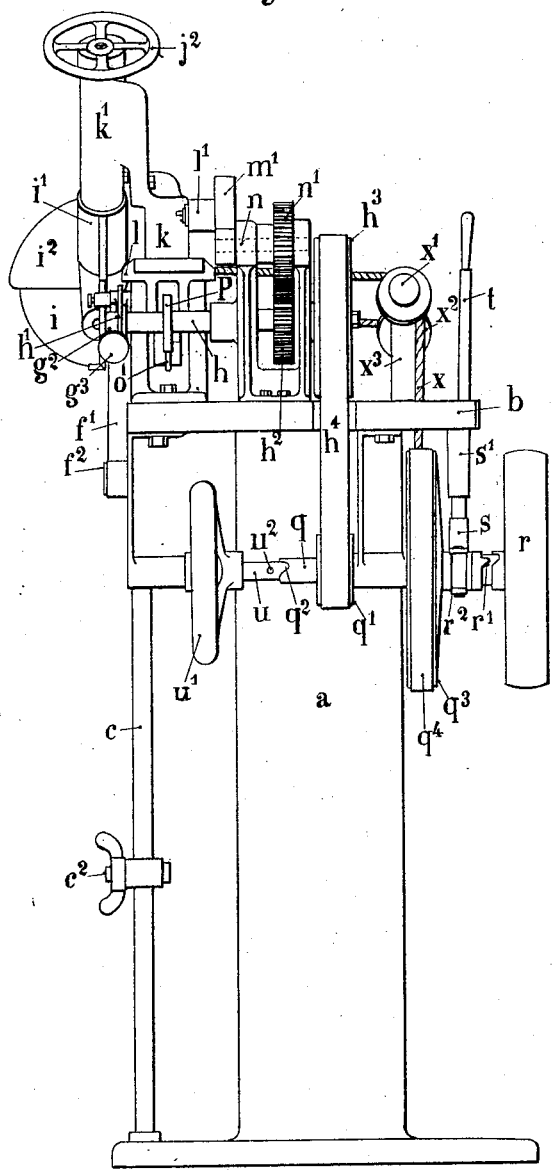
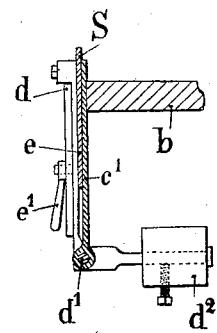
INVENTOR
JEAN T. LANFRANCHI
BY
ATTORNEYS March 17, 1925.                                                 1,530,378
J. T. LANFRANCHI
MACHINE FOR SHARPENING WITH A GRINDSTONE CIRCULAR AND BAND SAWS
Filed Jan. 10, 1921          4 Sheets-Sheet 4

I

II

III

IV

V

INVENTOR
JEAN T. LANFRANCHI
BY Mumdled
ATTORNEYS

Patented Mar. 17, 1925.

1,530,378

UNITED STATES PATENT OFFICE.

JEAN TOUSSAINT LANFRANCHI, OF PARIS, FRANCE, ASSIGNOR TO CHARLES GASTON VEYSSIERE, OF ST. CLOUD, FRANCE.

MACHINE FOR SHARPENING WITH A GRINDSTONE CIRCULAR AND BAND SAWS.

Application filed January 10, 1921. Serial No. 436,288.

*To all whom it may concern:*

Be it known that I, JEAN TOUSSAINT LANFRANCHI, of 4 Place Martin-Nadaud, Paris, France, engineer, have invented a Machine for Sharpening with a Grindstone Circular and Band Saws, of which the following is a full, clear, and exact description.

This invention relates to a machine for automatically sharpening circular and bandsaws having teeth of any profile and separated from each other by any intervals.

The new machine is extremely simple and efficient and the adjustment of all the members according to the type of saws to be sharpened can be obtained very exactly with ease and rapidity. The simplicity of the mechanism allows to obtain a machine which is durable and of low cost.

This machine is essentially characterized by an inclined grindstone-carrier integral with a reciprocating carriage guided on a rocking slide the movement of which is controlled by a cam having a profile corresponding to that of the tooth of the saw to be sharpened.

The machine is characterized, moreover, by a saw guide-support, of suitable height, constituted by a kind of automatically closing clasp.

The machine comprises also a driving device permitting to rotate the said machine by hand for conveniently effecting with precision the various necessary adjustments.

Figure 1:
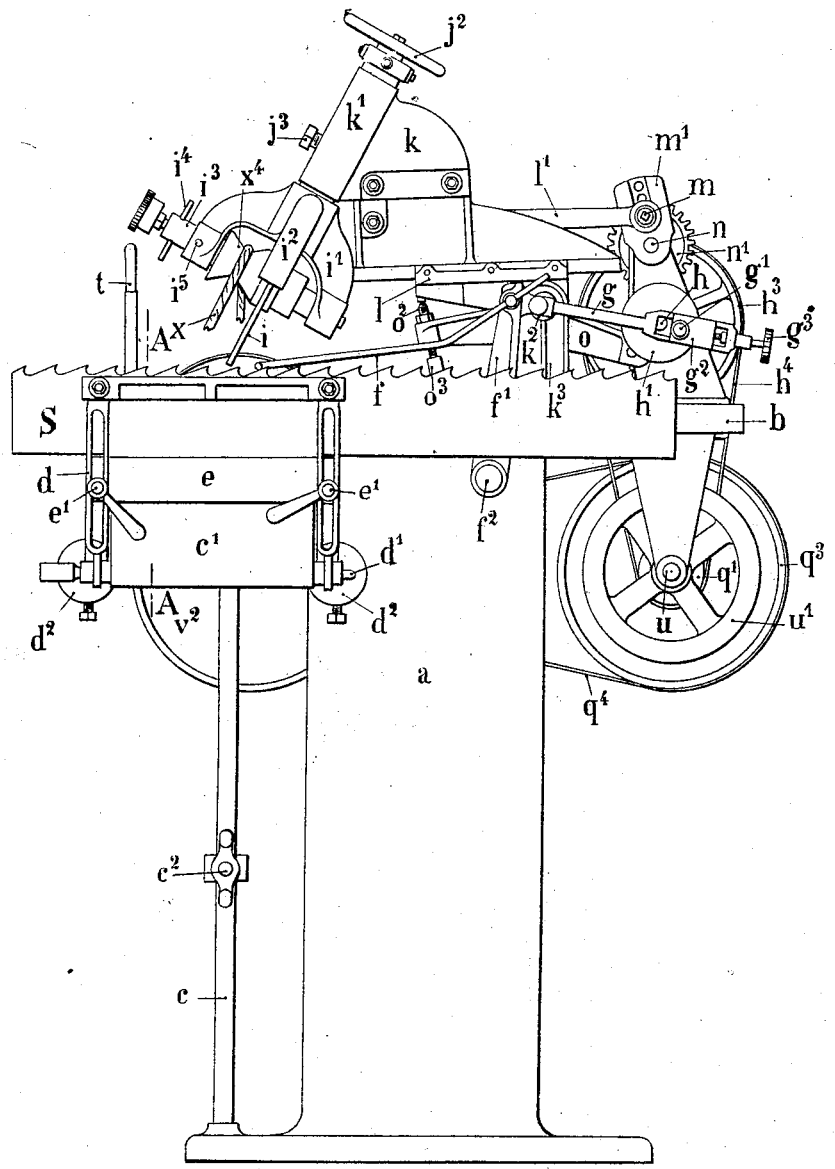
Figure 2:
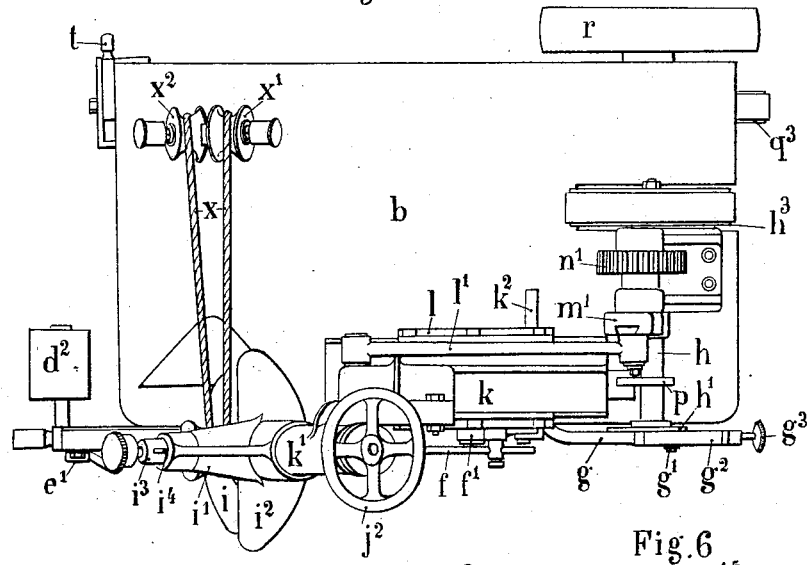
Figures 3, 6:
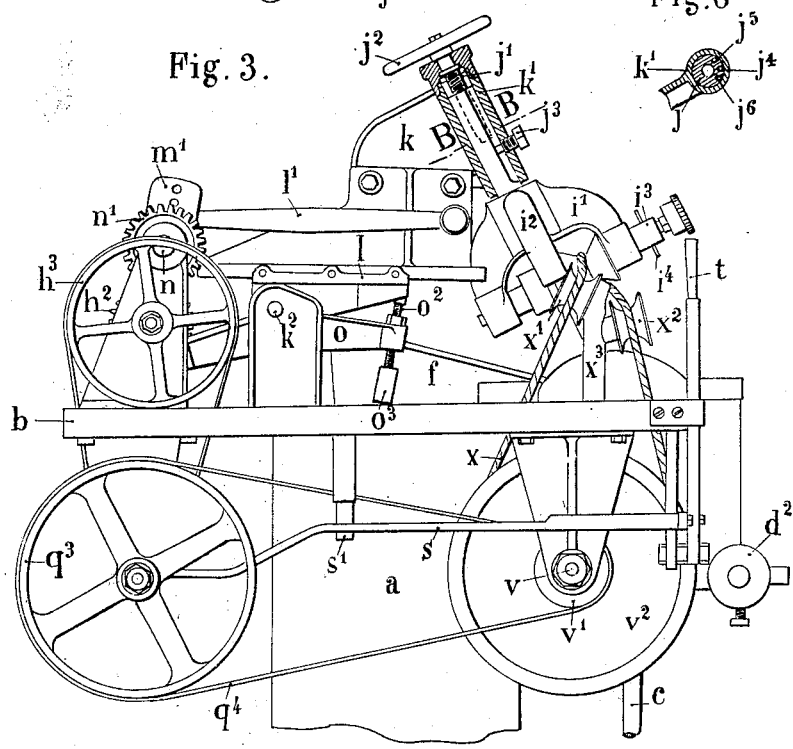
Figure 7:
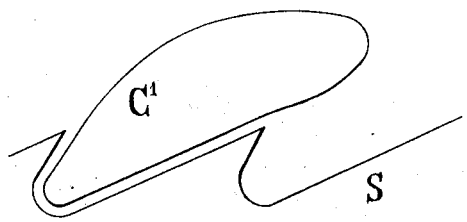
Figure 7:
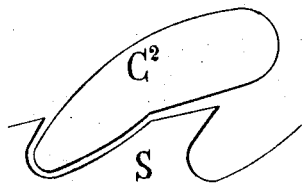
Figure 7:
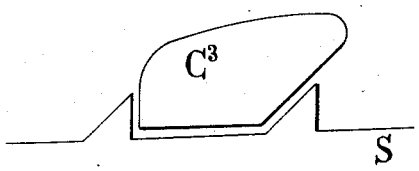
Figure 7:
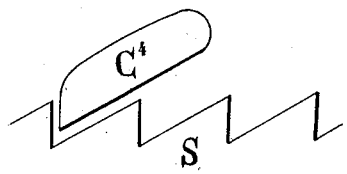
Figure 7:
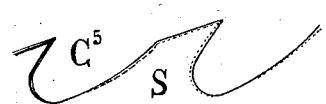

The invention is illustrated, by way of example only, in the accompanying drawing, in which:

Fig. 1 is an elevation of the machine.
Fig. 2 is a corresponding plan view.
Fig. 3 is an elevation of the rear side.
Fig. 4 is a side view.
Fig. 5 is a section made according to line A—A of Fig. 1.
Fig. 6 is a section made according to line B—B of Fig. 3.
Fig. 7 is a diagrammatic view showing the curves described by the grindstone at each tooth.

As illustrated in the drawing, the new machine comprises a frame $a$ supporting a table $b$.

On one side of the machine is arranged an upright $c$ carrying a plate $c^1$ constituting the fixed side of the saw supporting clasp. This plate carries an axis of oscillation $d^1$ on which rotates a frame $d$ forming the movable part of the clasp which is pressed against the fixed part by counterweights $d^2$ or springs.

Between the plate $c^1$ and the frame $d$ is arranged a blade $e$ adapted to support the saw S and the height of which can be adjusted by means of handle screws $e^1$ passing through vertical slots provided in the frame.

The saw, fitted in the saw guide clasp above described, moves forward periodically to the extent of one tooth, through the medium of a thrust or push rod $f$ mounted on a lever $f^1$ rotating on a fixed axis $f^2$ integral with the support $k^3$ carried by the frame $a$. This lever is actuated by a link $g$ hinged on a crank-pin $g^1$ presented by a disk $h^1$ fast on the cam shaft $h$. This crank-pin, which constitutes an eccentric, can be axially displaced on the disk $h^1$, so as to permit of adjusting the stroke of the link $g$ and, consequently, that of the rod $f$, according to the spacing apart of the teeth. On the other hand, the link $g$ is connected to the crank-pin $g^1$ through the medium of a slide-block $g^2$ provided with a returning screw $g^3$, so as to permit of adjusting the position of the rod $f$ relatively to the saw.

The grindstone $i$ adapted to sharpen the saw is mounted on an inclined grindstone carrier $i^1$ provided with a hood $i^2$ for protection against splinters.

This grindstone-carrier is provided with two arms, as shown in Fig. 1, supporting the axis of the grindstone. In order to allow of easily removing the grindstone it is loosely mounted on the axis $i^3$ which is smooth. A pin $i^4$ is adapted to manipulate it easily. A set screw $i^5$ holds the said axis stationary. It suffices to unloose this screw for removing the axis $i^3$ by longitudinal displacement parallely to itself; this grindstone is thus disengaged.

The arms of the grindstone-carrier are integral with a rod $j$, Fig. 3, engaged in a sleeve $k^1$ forming a part of the carriage $k$. This rod is hollow adjacent to its upper end and internally screw-threaded to receive a screw $j^1$ carrying a hand wheel $j^2$, by means of which it may be rotated, thus causing the grindstone-carrier to rise or lower.

The rod is guided in its upward and downward movement by a screw $j^3$ the end of which is engaged in a longitudinal groove $j^4$ in this rod, Figs. 3 and 6.

The said rod $j$ is provided with two other similar grooves $j^5$, $j^6$ arranged on the opposides of the first groove, allowing to give to the grindstone a certain inclination relatively to the saw.

The carriage $k$ can have a reciprocating movement on a slide $l$. This movement is controlled by a link $l^1$ hinged on a pin $m$ which can occupy several positions on a crank $m^1$ fast on a shaft $n$; this shaft is actuated by the cam shaft by means of two pinions $n^1$ and $h^2$, Fig. 4.

The slide $l$ can rock on an axis $k^2$, Fig. 1, carried by a support $k^3$; on this axis is also mounted a lever $o$ on which rests the slide. This lever carries, at one end, a roller $o^1$, Fig. 4, in contact with a cam $p$ fast on the cam shaft $h$ and at the other end, a screw $o^2$, Fig. 1, on which rests the slide and adapted to limit the downward movement of the grindstone.

The cam shaft $h$ carries a pulley $h^3$, Fig. 4, on which passes a belt $h^4$ driven by a pulley $q^1$ fast on the driving shaft $q$.

On the end of this shaft $q$ is loosely mounted a pulley $r$ on which passes any driving belt. This pulley can be clutched with the shaft $q$, by means of a claw sleeve $r^1$ fitting in corresponding notches of the hub of the pulley. The sleeve $r^1$ is displaced by a fork $r^2$ terminating a lever $s$, Fig. 3, pivoting on a fixed axis $s^1$. This lever is controlled by a clutch lever $t$ terminated by a fork engaged on the end of the lever $s$.

The shaft $q$ is hollow and within this shaft is arranged a short shaft $u$, Fig. 4, carrying a hand wheel $u^1$ and provided with a tenon $u^2$. The latter may fit into a notch $q^2$ of the shaft $q$ provided with an incline on one of its sides.

On the shaft $q$ is fastened another pulley $q^3$ carrying a belt $q^4$ passing on a pulley $v^1$, Fig. 3; the latter is rigidly secured on a shaft $v$, arranged under the machine and carrying a groove pulley $v^2$ on which passes a twisted belt $x$. The branches of this belt pass on two other groove pulleys $x^1$ and $x^2$ carried by a guide $x^3$ of adjustable height and serving as stretcher. The belt $x$ actuates a pulley $x^4$ fast on the hub of the grindstone $i$, Fig. 1.

The operation is as follows:

If a band saw is to be sharpened, this saw is placed in the guide system and for that purpose the movable part $d$ of the clasp is opened and the supporting member $e$ is adjusted to the necessary position for causing the saw to present its teeth above the table at the required height.

If a circular saw is to be sharpened, the part $d$ of the clasp is taken off, by removing the axis $d^1$ which, for that purpose is so arranged as to be capable of being instantaneously taken away; the central perforation of the saw is then placed on an axis $c^2$ carried on the upright $c$. The height of the support of this axis is adjusted according to the size of the saw.

The shaft $h$ being provided with a cam corresponding to the shape of the teeth of the saw to be sharpened, the machine is adjusted.

In order to do this, the operator acts on the hand wheel $u^1$, thus causing the members of the machine to rotate slowly.

He can then see easily and without danger the curve described by the grindstone. If necessary, he modifies this curve by changing the position of the pin $m$ in the crank $m^1$, so as to vary the stroke of the carriage $k$ on the slide $l$.

This adjustment which, in the other sharpening machines provided with a grindstone, is a long and delicate operation, is, on the contrary, in the new machine, very easy and rapid, as it suffices to act on one screw only, located within reach of the hand and the effects of which are constantly visible.

The operator adjusts also the stroke of the thrust or push rod $f$ which must be equal to the spacing apart of the teeth and for that purpose he changes if necessary the position of the pin $g^1$.

Then, he suitably positions the thrust or push rod according to the position of the saw, by rotating the returning screw $g^3$ of the slide-block $g^2$.

In order to verify the extent of the stroke of the carriage $j$, a nut $o^3$ engaged on the screw $o^2$ may be unscrewed so as to bring this nut in contact with the table and to move the roller $o^1$ away from the cam $p$. In this position, the carriage $k$ effects its to-and-fro movements without oscillation.

When the various adjustments have been effected the operator pushes the operating lever $t$; the lever $s$ rocks on its axis and brings the tenons of the sleeve $r^1$ in engagement with the corresponding notches of the hub of the pulley $r$. He thus renders the shaft $q$ integral with the driving pulley $r$ and determines the starting. The incline of the notch $q^2$ pushes back the tenon $u^2$, thus disengaging the shaft $u$ of the hand-wheel from the shaft $q$.

The machine can be provided with a funnel for receiving the emery dust, this funnel being arranged behind the grindstone; an aspirator, arranged at any point whatever of the machine, can lead away the emery dust and evacuate it outside or in a suitable collector.

Figure 7 shows different profiles of saw blades which may be sharpened by means of the new machine and the corresponding curves $C^1$, $C^2$, $C^3$, $C^4$ described by the operative edge of the grindstone. It will be noted that by the combination of the to-and-fro movements of the carriage and the rocking movement of the slide, controlled by the cam, these curves can be very different and absolutely suited to the shape of the teeth.

In case the teeth should be bevelled, as shown at $C^5$, Fig. 7, the screw $j^3$ is unloosened out the rod $j$ is caused to rotate on itself, so as to bring one or the other of the grooves $j^5$, $j^6$ opposite this screw which is re-tightened. There is thus obtained a cut inclined in one direction or the other.

The above arrangements are given by way of example only; the forms, dimensions and materials used and all detail arrangements may be varied according to the circumstances without departing thereby from the nature of the invention.

Claims:

1. In a machine for sharpening saws, an inclined grindstone carrier, a rocking slide on which said carrier has a to-and-fro motion, means for moving the carrier on the slide at each stroke for sharpening a tooth on a saw and means for rocking the slide while each tooth is being sharpened.

2. In a machine for sharpening saws, an inclined grindstone carrier, a rocking slide on which said carrier has a to and fro motion, means for moving the carrier on the slide for sharpening the teeth of a saw, and a cam for rocking the slide, the cam having a profile corresponding to the profile of a saw tooth.

3. In a machine for sharpening saws, an inclined grindstone carrier, a rocking slide on which the carrier has a to-and-fro-motion, means for imparting the to-and-fro-movement to the slide, and means for rocking the slide, said means including a lever engaging the slide, and a cam for operating the said lever.

4. In a machine for sharpening saws, an inclined grindstone carrier, a rocking slide on which said carrier has a to-and-fro motion, means for moving the carrier on the slide, means for rocking the slide, said means comprising a lever engaging the slide and a cam engaging the lever, and adjusting means to vary the stroke of the grindstone carrier according to the distance from point to point of the saw teeth.

5. In a machine for sharpening saws, an inclined grindstone carrier, a rocking slide on which said carrier has a to-and-fro motion, means for moving the carrier on the slide, means for rocking the slide, said means rocking the slide while each tooth is being sharpened and comprising a lever pivoted intermediate of its ends and carrying at one end means for engaging the slide, and a cam for operating said lever,—means for pushing forward the saw periodically to the extent of one tooth,—and means to vary the advance of the saw.

6. In a machine for sharpening saws, a drive shaft, an inclined carrier, a grindstone mounted in the carrier, a pivoted slide on which said carrier is movable, means for operating the grindstone and carrier from the drive shaft, a hand wheel for operating the operating means, a clutch device for connecting the hand wheel with the drive shaft, and means for rocking the slide on its pivot as each tooth is sharpened, said means comprising a lever pivoted intermediate of its ends and having at one end adjustable means for engaging the slide, and a cam engaging the other end of the lever.

7. In a machine for sharpening saws, a grindstone, a movable carrier therefor, a pivoted slide for said carrier, means to reciprocate the carrier on the slide, and means to rock the carrier and slide about the pivot, said means rocking the carriers as each tooth is sharpened and comprising a lever pivoted intermediate of its ends and having on one end adjustable means for engaging the slide and a cam engaging the other end of the lever.

8. In a saw sharpening machine, a saw support, a grindstone carrier mounted in operative position with respect thereto, driving mechanism for the grindstone including a shaft, means to reciprocate the grindstone with respect to the support, means for rocking the grindstone as each tooth is sharpened and means carried by the shaft for simultaneously moving the grindstone vertically with respect to the support and for periodically moving a saw within the support a predetermined amount.

9. In a machine for sharpening saws, a reciprocating grindstone carrier, a rocking slide on which the carrier is mounted, a pivoted lever having at one end means for loosely engaging the underside of the slide, means for operating the lever, and means for disengaging the said lever from its operating means.

10. In a machine for sharpening saws, a reciprocating grindstone carrier, a pivoted slide on which the carrier is mounted, a pivoted lever having a screw in one end for loosely engaging the underside of the slide, a cam engaging the other end of the lever, and means for disengaging the lever from the cam.

11. In a machine for sharpening saws, a hollow revoluble shaft, a shaft slidable in the hollow shaft and having a hand wheel, cooperating means on said shafts for turning the hollow shaft from the shaft having the hand wheel, a driving pulley loose on the hollow shaft, and a clutch for connecting the pulley to the shaft.

The foregoing specification of my "Machine for sharpening with a grindstone circular and band saws", signed by me this 17th day of December, 1920.

JEAN TOUSSAINT LANFRANCHI.